United States Patent
Bhuiya et al.

(10) Patent No.: US 10,387,860 B2
(45) Date of Patent: Aug. 20, 2019

(54) TRANSACTION PROCESSING BASED ON COMPARING ACTIONS RECORDED ON MULTIPLE DEVICES

(71) Applicant: International Business Machines Corporation, Armonk, NY (US)

(72) Inventors: Subhajit Bhuiya, Bangalore (IN); Ajay Chebbi, Bangalore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 15/398,592

(22) Filed: Jan. 4, 2017

(65) Prior Publication Data

US 2018/0189759 A1 Jul. 5, 2018

(51) Int. Cl.
| | |
|---|---|
| *G06F 3/01* | (2006.01) |
| *G06K 7/10* | (2006.01) |
| *G06K 7/14* | (2006.01) |
| *G06K 17/00* | (2006.01) |
| *G06Q 10/08* | (2012.01) |
| *G06Q 20/20* | (2012.01) |
| *G06Q 20/40* | (2012.01) |

(Continued)

(52) U.S. Cl.
CPC .............. *G06Q 20/20* (2013.01); *G06F 3/017* (2013.01); *G06F 3/03547* (2013.01); *G06F 3/04883* (2013.01); *G06Q 20/4014* (2013.01); *G06F 2203/0331* (2013.01); *G06K 7/10366* (2013.01); *G06K 7/1413* (2013.01); *G06K 17/0022* (2013.01); *G06Q 10/087* (2013.01)

(58) Field of Classification Search
USPC ............................................... 705/44
See application file for complete search history.

(56) References Cited

U.S. PATENT DOCUMENTS

| 7,130,452 B2 | 10/2006 | Bolle et al. | |
|---|---|---|---|
| 2011/0070863 A1* | 3/2011 | Ma .......................... | H04W 4/02 455/410 |

(Continued)

*Primary Examiner* — Florian M Zeender
*Assistant Examiner* — Nicole Elena Bruner
(74) *Attorney, Agent, or Firm* — Patterson + Sheridan, LLP

(57) ABSTRACT

The present disclosure relates to authenticating transactions based on actions performed on a merchant and a customer device. An example method generally includes receiving, from a point of sale system, data identifying a transaction, wherein the data includes a merchant identifier and a payment account identifier. A transaction system determines, based on the merchant identifier and the payment account identifier, a merchant device and a customer device on which user movement recording is to be activated; and instructs the merchant device and customer device to activate movement recording. The transaction system receives merchant movement data describing a recorded user movement performed using the merchant device and customer movement data describing a recorded user movement performed using the customer device. Upon determining that the data describing the recorded merchant movement data and the recorded customer movement data satisfy predefined criteria, the transaction system processes the transaction using the payment account identifier.

12 Claims, 6 Drawing Sheets

(51) Int. Cl.
*G06F 3/0354* (2013.01)
*G06F 3/0488* (2013.01)

(56) References Cited

U.S. PATENT DOCUMENTS

| | | | |
|---|---|---|---|
| 2014/0282068 A1* | 9/2014 | Levkovitz | G06Q 20/223 |
| | | | 715/748 |
| 2014/0321719 A1* | 10/2014 | Newman | G06F 21/32 |
| | | | 382/117 |
| 2015/0120471 A1* | 4/2015 | Cooke | G06Q 20/3224 |
| | | | 705/16 |
| 2015/0127541 A1 | 5/2015 | Just et al. | |
| 2015/0237045 A1 | 8/2015 | Blessing | |

* cited by examiner

TRANSACTION PROCESSING BASED ON COMPARING ACTIONS RECORDED ON MULTIPLE DEVICES

BACKGROUND

The present invention relates to authenticating and processing transactions, and more specifically, to comparing actions performed on merchant and purchaser devices to authenticate a transaction generated at a point of sale (POS) system.

To initiate a transaction at a POS system, a user generally swipes a payment card (e.g., a credit or debit card) at the POS system. The POS system generally prompts a user for input to authenticate the transaction. For example, the POS system may prompt the user to sign for the transaction or input a personal identification number (PIN) associated with the payment card to authenticate the transaction. Using a PIN may be insecure, however, as malicious actors can record payment card information and a user's PIN (e.g., using video recording, card skimmers, and so on). Because a PIN is generally static, malicious actors can incur unauthorized charges on a payment account using payment card information and a recorded PIN until the account owner notices the unauthorized charges and changes the PIN associated with the payment card.

To add security to transaction authentication systems, additional methods may be used to verify that the user is attempting to complete a transaction. For example, a transaction system can request entry of a one-time-use code from the owner of a payment card. The user can receive the one-time-use code, for example, via a short messaging service (SMS) text message and enter the received code at the POS system. If the code entered into the POS system matches the one-time-use code, the POS system can authorize the transaction. In another example, a transaction authentication system can use geolocation data (e.g., from a satellite positioning system, such as GPS, GALILEO, or GLONASS) to determine if a user is at the same location as the POS system. If the user and POS system are substantially co-located (e.g., within a threshold distance, accounting for positioning errors in the reported geolocation data), the POS system can authorize the transaction.

SUMMARY

One embodiment disclosed herein includes a method for authenticating a transaction. The method generally includes receiving, from a point of sale system, data identifying a transaction, wherein the data includes a merchant identifier and a payment account identifier. A transaction system determines, based on the merchant identifier and the payment account identifier, a merchant device and a customer device on which user movement recording is to be activated; and instructs the merchant device and customer device to activate movement recording. The transaction system receives merchant movement data describing a recorded user movement performed using the merchant device and customer movement data describing a recorded user movement performed using the customer device. Upon determining that the data describing the recorded merchant movement data and the recorded customer movement data satisfy predefined criteria, the transaction system processes the transaction using the payment account identifier.

Another embodiment includes a computer-readable storage medium having instructions, which, when executed on a processor, performs an operation for authenticating a transaction. The operation generally includes generally includes receiving, from a point of sale system, data identifying a transaction, wherein the data includes a merchant identifier and a payment account identifier. A transaction system determines, based on the merchant identifier and the payment account identifier, a merchant device and a customer device on which user movement recording is to be activated; and instructs the merchant device and customer device to activate movement recording. The transaction system receives merchant movement data describing a recorded user movement performed using the merchant device and customer movement data describing a recorded user movement performed using the customer device. Upon determining that the data describing the recorded merchant movement data and the recorded customer movement data satisfy predefined criteria, the transaction system processes the transaction using the payment account identifier.

Still another embodiment includes a processor and a memory storing a program, which, when executed on the processor, performs an operation for authenticating a transaction. The operation generally includes generally includes receiving, from a point of sale system, data identifying a transaction, wherein the data includes a merchant identifier and a payment account identifier. A transaction system determines, based on the merchant identifier and the payment account identifier, a merchant device and a customer device on which user movement recording is to be activated; and instructs the merchant device and customer device to activate movement recording. The transaction system receives merchant movement data describing a recorded user movement performed using the merchant device and customer movement data describing a recorded user movement performed using the customer device. Upon determining that the data describing the recorded merchant movement data and the recorded customer movement data satisfy predefined criteria, the transaction system processes the transaction using the payment account identifier.

DETAILED DESCRIPTION

Embodiments presented herein describe techniques for authenticating and authorizing transactions performed on a point-of-sale (POS) system. As described herein, personal computing devices (e.g., wearable devices, such as a smartwatch or augmented reality headset, cell phones, or other mobile devices) owned by both the merchant and the purchaser can be activated when a transaction is recorded at a POS system. A transaction processor can compare action information (e.g., movement information recorded gyroscopes and/or accelerometers in a personal computing device, coordinates of touchscreen input on a device, and so on) received from the merchant and purchaser personal computing devices to determine whether to authorize the transaction. If the action information received from the merchant personal computing device matches the action information received from the purchaser personal computing device, the transaction processor can verify that the transaction is a valid transaction and continue to process the transaction. Otherwise, the transaction processor can block the transaction and, in some cases, take one or more actions to disable use of a payment card.

By authenticating and authorizing transactions based on action information received from merchant and purchaser personal computing devices, a transaction processing system can securely process transactions without requiring user input of data (e.g., a PIN) that could compromise the security of the payment card. Further, users need not manually enter a one-time use code received in an SMS message, which may accelerate transaction processing and prevent transaction processors from falsely detecting that a payment card is compromised (e.g., if the payment card owner types in an incorrect one-time-use code). Because action information need not rely on data from satellite positioning system (SPS) receivers, transaction processing based on a comparison of action information received from merchant and purchaser personal computing devices may avoid delays in transaction processing caused by delays (or failure) to obtain a signal from an SPS (e.g., in areas with high signal attenuation, such as in skyscrapers or buildings that degrade the received strength of signals from SPS satellites).

Figure 1:
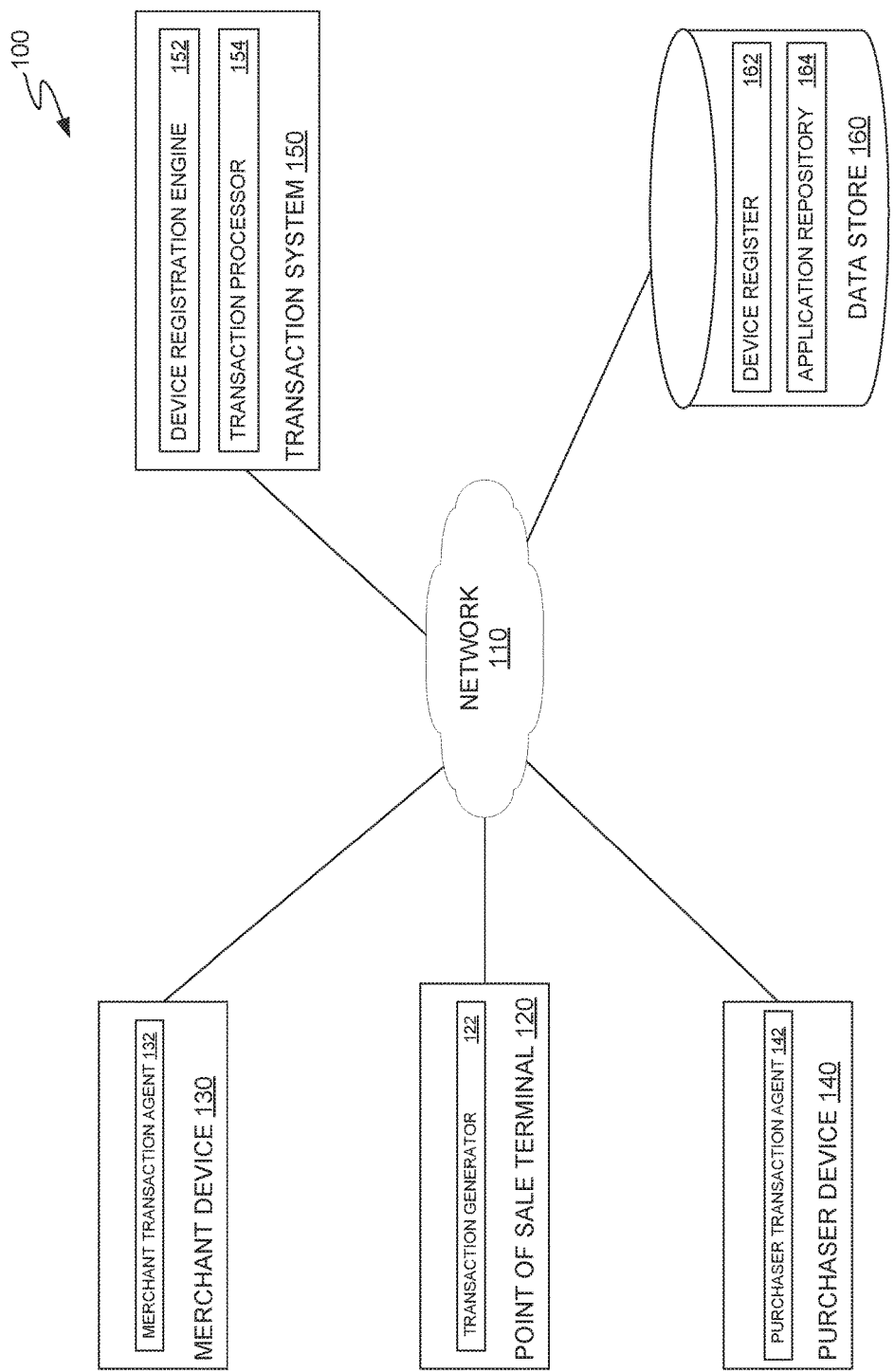
FIG. 1 illustrates an example of a networked computing environment, according to one embodiment.

FIG. 1 illustrates an example networked computing environment in which a transaction processor compares action information received from a purchaser and a merchant personal computing device to authenticate and authorize transactions, according to an embodiment of the present disclosure. As illustrated, computing environment 100 generally includes a point of sale terminal 120, merchant device 130, purchaser device 140, transaction system 150, and data store 160, connected via network 110.

POS terminal 120 generally initiates a transaction when a purchaser provides payment card data to POS terminal 120 (e.g., by swiping a payment card through a magnetic stripe reader or inserting a chip-enabled payment card into a chip reader). As illustrated, POS terminal 120 generally includes a transaction generator 122.

Transaction generator 122 is generally configured to transmit information about a transaction to transaction system 150 to begin the transaction authorization process. The information transmitted to transaction system 150 may include, for example, an identity of the merchant, a payment amount, payment card information, and so on. In some cases, the information transmitted by transaction generator 122 may be encrypted before transmission to transaction system 150.

In some cases, if a merchant device 130 and purchaser device 140 is registered with transaction system 150, POS system 120 may receive a message from transaction system 150 indicating that the transaction will be authenticated using a comparison of actions performed by the merchant and the purchaser. A display at POS system 120 may display a message to the merchant and purchaser, in response to the message received from transaction system 150, that the transaction will be authenticated using a comparison of actions performed on merchant device 130 and purchaser device 140 and indicate when to begin the authentication process. For example, the message may indicate that transaction system 150 is waiting for merchant device 130 and/or purchaser device 140 to connect to transaction system 150, and when both merchant device 130 and purchaser device 14 connect to transaction system 150, POS system 120 may display a message to both the merchant and purchaser to indicate that the authentication process may begin.

Merchant device 130 may be a personal computing device with one or more sensors for tracking actions performed on merchant device 130, such as accelerometers, gyroscopes, compasses, and so on. In some cases, merchant device 130 may be a wearable device, such as a smartwatch or augmented reality headset. In other cases, merchant device 130 may include one or more input devices through which actions can be performed, such as a touchscreen, physical buttons, dials, and so on.

As illustrated, merchant device 130 may include a merchant transaction agent 132. Merchant transaction agent 132 may be installed on merchant device 130 when a merchant initially registers merchant device 130. During initial registration, merchant device 130 transmits information identifying the device (e.g., an International Mobile Equipment Identifier (IMEI), a device serial number, a SIM card identification number, and so on) to transaction system 150. In response, merchant device 130 receives a package including merchant transaction agent 132 and installs the package on merchant device 130.

When POS system 120 transmits transaction information to transaction system 150, merchant device 130 may receive signaling from transaction system 150 to trigger recording of actions performed on merchant device 130 by merchant transaction agent 132. The actions recorded from merchant device 130 may include, for example, a direction of motion (e.g., moving a smartwatch in a particular direction, changing head direction on an augmented reality headset), touchscreen input patterns, and so on. In some cases, merchant device 130 can generate an alert to notify the owner of merchant device 130 that an action-based transaction verification process has begun. The alert may be, for example, an audio-visual alert (e.g., an on-screen notification accompanied by an audible notification), a haptic alert (e.g., one or more vibrations indicating that action recording is active), or a combination of haptic and audio-visual alerts.

After transaction system 150 triggers action recording on merchant device 130, merchant transaction agent 132 can record and transmit action information until merchant transaction agent receives signaling from transaction system 150 indicating that the transaction verification process is complete. When merchant transaction agent 132 receives the signaling indicating that the transaction verification process is complete, merchant transaction agent 132 can deactivate action recording on merchant device 130.

Purchaser device 140 may also be personal computing device, such as a wearable device (e.g., a smartwatch or augmented reality headset), with one or more sensors for tracking actions performed on purchaser device 140, such as accelerometers, gyroscopes, compasses, or other input devices through which actions can be performed.

An owner of a payment card may register purchaser device 140 with transaction system 150, for example, during activation of the payment card. During registration, purchaser device 140 may transmit information to transaction system 150 that uniquely identifies purchaser device 140 (e.g., an International Mobile Equipment Identifier (IMEI), a device serial number, a SIM card identification number, and so on). When purchaser device 140 is registered with transaction system 150, purchaser device 140 may receive an application package including purchaser transaction agent 142, which purchaser device 140 can unpack and install on purchaser device 140.

When POS system 120 transmits transaction information to transaction system 150 (e.g., after the owner of purchaser device 140 swipes a payment card at POS system 120), purchaser device 140 may receive signaling from transaction system 150 to trigger recording of actions performed on purchaser device 140 by purchaser transaction agent 142. The actions recorded on purchaser device 140 may include, for example, a direction of motion (e.g., moving a smartwatch in a particular direction, changing head direction on an augmented reality headset), touchscreen input patterns, and so on. In some cases, purchaser device 140 can generate an alert to notify the owner of purchaser device 130 that an action-based transaction verification process has begun. The alert may be, for example, an audio-visual alert (e.g., an on-screen notification accompanied by an audible notification), a haptic alert (e.g., one or more vibrations indicating that action recording is active), or a combination of haptic and audio-visual alerts.

After transaction system 150 triggers action recording on purchaser device 140, purchaser transaction agent 142 can record and transmit action information until merchant transaction agent receives signaling from transaction system 150 indicating that the transaction verification process is complete. When purchaser transaction agent 142 receives the signaling indicating that the transaction verification process is complete, purchaser transaction agent 142 can deactivate action recording on purchaser device 140.

Transaction system 150 is generally configured to register merchant devices 130 and purchaser devices 140 for use in action-based transaction authorization and initiate action-based transaction authorization in response to receiving transaction information from a POS system 120. As illustrated, transaction system 150 generally includes a device registration engine 152 and a transaction processor 154.

Device registration engine 152 is generally configured to receive information from merchant devices 130 and purchaser devices 140 to register devices for use in an action-based transaction authorization process. During registration, device registration engine receives data identifying a device as a merchant device (e.g., associated with a merchant account) or a purchaser device (e.g., associated with an owner of a payment card) and data that uniquely identifies the device (e.g., an IMEI, device serial number, SIM identification number, and so on). Device registration engine 152 can save the device identifier to device register 162 in data store 160 for use in determining whether to invoke an action-based transaction authorization process. After saving device information to device register 162, device registration engine 152 retrieves an application package from application repository 164 and pushes the application package to a newly registered merchant device 130 or purchaser device 140.

Transaction processor 154 generally receives transaction information from POS system 120 to determine whether to activate an action-based transaction authorization process. The transaction information received from POS system 120 may include, for example, a transaction amount, data identifying the merchant, and data identifying the purchaser (e.g., payment card data). Based on the data identifying the merchant and the purchaser, transaction processor 154 searches a device register (e.g., device register 162 at data store 160) to determine if both the merchant and purchaser have registered devices for use in an action-based transaction authorization process. If one or both of the merchant or purchaser does not have a registered device, transaction processor 154 can perform transaction authentication using, for example, a PIN associated with the purchaser's payment card, a text message including an authentication code to enter at POS system 120, a text message requesting confirmation of the transaction, and so on.

If merchant device 130 and purchaser device 140 are registered with transaction system 150 (e.g., are found in device register 162 at data store 160), transaction processor 154 can transmit signaling to both merchant device 130 and purchaser device 140 to indicate that the transaction will be authenticated and verified based on actions recorded on the devices. In some cases, transaction processor 154 can receive an indication from both merchant device 130 and purchaser device 140 when both devices are ready to transmit action information to transaction processor 154 for comparison.

Transaction processor 154 may initially receive a first indication of actions performed on merchant device 130. The indication may include, for example, a direction in which a wearable device was moved (e.g., recorded from gyroscopes and/or accelerometers in a wearable device), one or more locations of touchscreen input, and so on. Upon receiving the first indication, transaction processor 154 may initiate a countdown timer representing a timeout period in which transaction processor 154 expects to receive action information from purchaser device 140. If the countdown timer expires before transaction processor 154 receives action information from purchaser device 140, transaction processor 154 may determine that the transaction is an unauthorized transaction and may deny the transaction. In denying a transaction, transaction processor 154 may provide signaling to the POS system indicating that the transaction has failed and may, in some cases, block future use of a payment card identified in the transaction information received from POS system 120.

If transaction processor 154 receives action information from purchaser device 140 before the countdown timer expires, transaction processor 154 generally compares the action information received from merchant device 130 to the action information received from purchaser device 140. If the action information received from merchant device 130 and purchaser device 140 differ (e.g., a wearer of merchant device 130 moves merchant device 130 vertically, while a wearer of purchaser device 140 moves purchaser device 140 vertically), transaction processor 154 may determine that the transaction is an unauthorized transaction and deny the transaction.

Otherwise, if action information received from purchaser device 140 matches action information received from merchant device 130, transaction processor 154 can determine if additional action information is needed to authenticate the transaction. If a threshold number of action comparisons has been successfully performed, transaction processor 154 can authorize the transaction. In authorizing the transaction, transaction processor 154 can post a charge on the purchase card and cause funds to be transferred from a purchaser account to a merchant account. Otherwise, transaction processor 154 can wait for additional action information from merchant device 130 and purchaser device 140, as discussed above, until the threshold number of action comparisons has been successfully performed or until transaction processor 154 identifies a difference in the actions that would cause transaction processor 154 to deny the transaction.

Data store 160 may be one or more databases used to store data identifying merchant devices 130 and purchaser devices 140 and transaction agent applications to be installed on a merchant device 130 or purchaser device 140 when a device is registered with transaction system 150. As illustrated, data store 160 generally includes device register 162 and application repository 164.

Device register 162 generally stores information identifying devices registered with transaction system 150 for use in action-based transaction authorization, as discussed above. In some cases, device register 162 may store identifiers of merchant devices 130 in a first data repository and identifiers of purchaser devices 140 in a second data repository. The identifiers of merchant devices 130 may be associated with data identifying a merchant account associated with a merchant device 130 (e.g., a bank account where payments are transferred from a purchaser account). The identifiers of purchaser devices 140 may be associated with data identifying a payment card owned by a purchaser for use in paying for transactions generated at POS system 120. As discussed above, when a transaction is generated at POS system 120 and received at transaction system 150, transaction processor 154 at transaction system 150 can query device register 162 to determine if identifiers of merchant device 130 and purchaser device 140 are included in device register 162, and if so, transaction system 150 can use a comparison of actions performed on merchant device 130 and purchaser device 140 to authenticate and authorize a transaction.

Application repository 164 generally stores application deployment packages for merchant transaction agent 132 and purchaser transaction agent 142. When a merchant initially registers a merchant device 130 with transaction system 150, transaction system 150 may identify a type of the merchant device 130 (e.g., a device running a particular operating system) and may provide the appropriate application package from application repository 164 to merchant device 130. Likewise, when a purchaser (e.g., a payment card owner) initially registers a purchaser device 140 with transaction system 150, transaction system 150 may identify a type of the purchaser device 140 and may provide the appropriate application package from application repository 164 to purchaser device 140.

Figure 2:
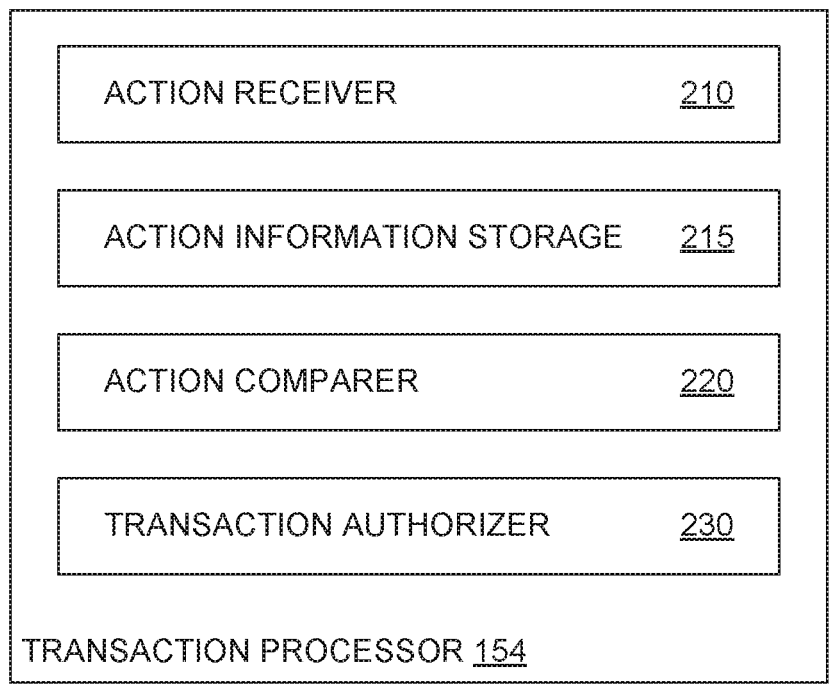
FIG. 2 is a block diagram illustrating an example transaction processor, according to one embodiment.

FIG. 2 illustrates an example transaction processor 154, according to an embodiment of the present disclosure. As illustrated, transaction processor 154 generally includes an action receiver 210, action comparer 220, and transaction authorizer 230.

Action receiver 210 is generally configured to receive action information from merchant devices 130 and purchaser devices 140 to determine if a transaction is valid (e.g., has been initiated by an owner of the payment card identified in the transaction). Transaction processor 154 may activate action receiver 210 upon receipt of transaction information from a POS system 120 and determining that both the owner of POS system 120 has a registered merchant device 130 and the owner of the payment card identified in the transaction information has a registered purchaser device 140.

When action receiver 210 receives action information (e.g., a direction of movement, location of touch screen input, and so on) from merchant device 130, action receiver 210 can store the merchant action information in a temporary data store, such as action information storage 215 in transaction processor 154. Action receiver may additionally activate a countdown timer for an expected time at which action receiver 210 should receive action information from purchaser device 140. If the countdown timer expires before action receiver 210 receives action information from a purchaser device 140 associated with a payment card used to generate the transaction, action receiver 210 may invoke transaction authorizer 230 with signaling indicating that the transaction should be rejected and may flush saved action information from the temporary data store (e.g., from action information storage 215). If action receiver 210 receives action information from purchaser device 140 before the countdown timer expires, action receiver 210 may transmit the action information received from merchant device 130 and the action information received from purchaser device 140 to action comparer 220 for further processing.

Action comparer 220 generally compares action information received from merchant device 130 (stored, for example, in action information storage 215) and action information received from purchaser device 140 to authorize or reject a transaction generated at POS system 120. Action comparer 220 may be invoked by action receiver 210 when action receiver 210 receives action information from a purchaser device 140 associated with the payment card identified in a transaction. If action comparer 220 determines that the actions recorded on merchant device 130 and purchaser device 140 differ, action comparer 220 can determine that the transaction should be rejected and can flush any saved action information from action information storage 215. In response to determining that the transaction should be rejected, action comparer 220 can signal transaction authorizer 230 with an indication that the transaction should be rejected (e.g., that a funds transfer from a purchaser account to a merchant account should not be performed).

If action comparer 220 determines that the actions recorded at merchant device 130 are substantially similar to actions recorded at purchaser device 140, action comparer 220 can increment a counter for tracking a number of actions that transaction processor 154 has received from a purchaser device 140 and determined to be substantially similar to actions performed on merchant device 130. The counter may be maintained, for example, in action information storage 215 or another temporary storage location used by transaction processor 154 for storing action information used in authorizing a transaction. A substantially similar action may include, for example, movement of a merchant device 130 and purchaser device 140 in the same directions over a window of time, a pattern of touchscreen input being substantially similar, and so on. If action comparer 220 has performed a threshold number of comparisons between actions recorded on merchant device 130 and purchaser device 140, action comparer 220 can signal transaction authorizer 230 with an indication that the transaction is authorized and can be processed (e.g., that a funds transfer can be performed between a purchaser account and a merchant account). Otherwise, action comparer 220 can wait to receive and compare additional action information from merchant device 130 and purchaser device 140.

Transaction authorizer 230 generally receives signaling from action receiver 210 and action comparer 220 and authorizes or rejects a transaction based on the information received from action receiver 210 and action comparer 220. As discussed herein, transaction authorizer 230 can receive signaling from action receiver 210 indicating that a transaction should be rejected in response to action receiver 210 failing to receive action information from a purchaser device within a threshold time period. Signaling from action comparer 220 may indicate whether a transaction should be allowed or rejected. A transaction may be rejected, for example, if action comparer 220 determines that actions recorded on a merchant device 130 and purchaser device 140 differ. A transaction may be allowed, for example, if action comparer 220 determines that a threshold number of matching actions have been received from merchant device 130 and purchaser device 140.

When transaction authorizer 230 rejects a transaction, transaction authorizer 230 may transmit an indication that the transaction was rejected to POS system 120. In some cases, transaction authorizer 230 may mark the payment card identified in the transaction information from POS system 120 as a potentially compromised card and block any future transactions performed using the payment card. If transaction authorizer 230 authorizes a transaction, transaction authorizer 230 can initiate a funds transfer from a purchaser account to a merchant account.

FIGS. 3A-3D illustrate a sequence of movements that may be received at transaction processor 154 from a merchant device 130 for comparison with received movements from a purchaser device 140, according to an embodiment. While the movements illustrated in FIGS. 3A-3D are illustrated in a two-dimensional space, it should be recognized that movement information may also be captured and compared in a three-dimensional space. In this example, four movements are compared to determine if a transaction is authorized or unauthorized; however, it should be recognized that any number of movement comparisons may be performed to authorize a transaction.

Figure 3A:
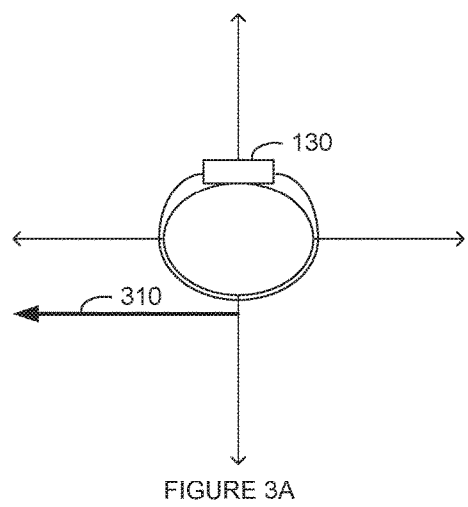
FIGS. 3A-3D illustrate a sequence of gestures performed by a merchant device for replication by a purchaser device during a transaction authentication process, according to one embodiment.

As illustrated in FIG. 3A, a person wearing merchant device 130 may start a sequence of movements at an origin point. First movement 310 involves the person wearing merchant device 130 moving the merchant device to the left along the horizontal axis without any movement on the vertical axis. If a wearer of purchaser device 140 also moves the purchaser device to the left along the horizontal axis without any movement on the vertical axis (i.e., the purchaser performs a substantially similar action), transaction processor 154 can increment a counter of matching movements and proceed to request that the person wearing merchant device 130 perform a second movement. Otherwise, if a wearer of purchaser device 140 moves in a different direction or does not generate any movement within a timeout period, transaction processor 154 can determine that the owner of a payment card presented at point of sale terminal 120 is not performing the transaction and can block the transaction from being processed.

Figure 3B:
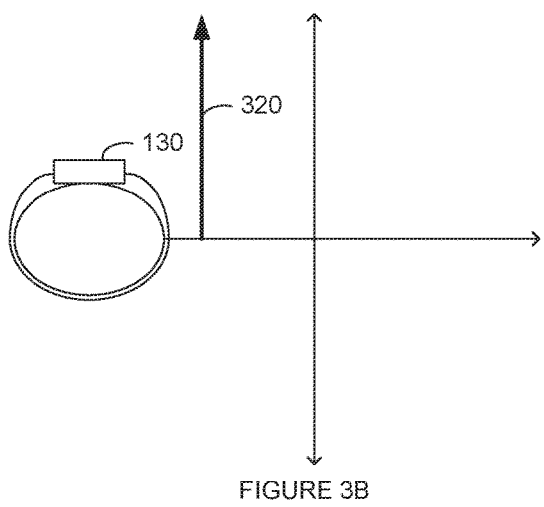

FIG. 3B illustrates a second movement 320 performed by the person wearing merchant device 130. As illustrated, second movement 320 starts from the point at which first movement 310 terminates and comprises an upward movement on the vertical axis without any movement on the horizontal axis. As discussed with respect to first movement 310 illustrated in FIG. 3A, transaction processor 154 can compare a corresponding movement performed by a person wearing purchaser device 140 to determine if the wearer of the purchaser device performed a substantially similar action. Based on the comparison, transaction processor 154 can either increment a counter of matching movements or determine that the movement information did not match and block the transaction from being processed.

Figure 3C:
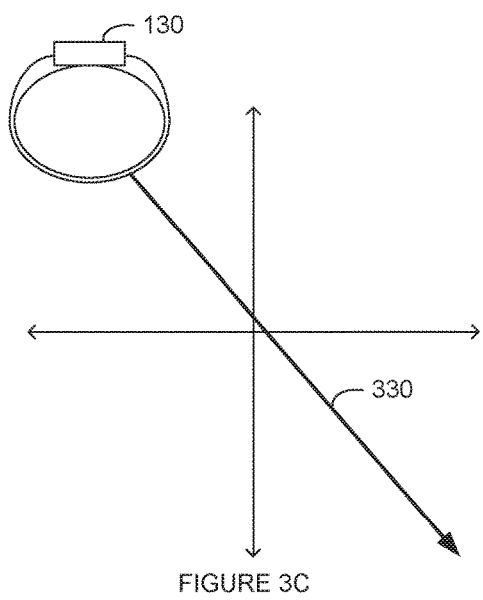

FIG. 3C illustrates a third movement 330 performed by the person wearing merchant device 130. As illustrated, third movement 330 starts from the point at which second movement 320 terminates and comprises a diagonal movement downwards on the vertical axis and rightwards on the horizontal axis. Again, as discussed herein, transaction processor 154 can compare a corresponding movement performed by a person wearing purchaser device 140 to determine whether to increment a counter of matching movements or block the transaction from being processed.

Figure 3D:
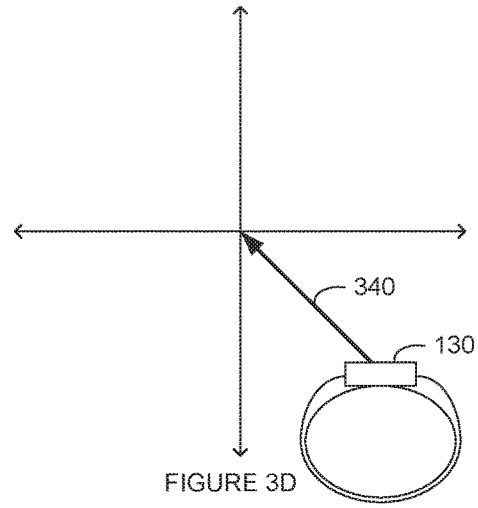

FIG. 3D illustrates a fourth movement 340 performed by the person wearing merchant device 130. As illustrated, fourth movement 340 starts from the point at which third movement 330 terminates and comprises a diagonal movement upwards on the vertical axis and leftwards on the horizontal axis, terminating at the point at which movement 310 started. If transaction processor 154 receives information about a substantially similar action from purchaser device 140, transaction processor 154 can increment the counter of matching movements and determine that the counter equals a threshold number of matching movements to authorize the transaction. In response, transaction processor 154 can authorize the transaction and initiate a funds transfer from a purchaser account to a merchant account. Otherwise, if transaction processor 154 determines that the wearer of purchaser device 140 did not perform a substantially similar movement, transaction processor 154 can reset the counter of matching movements, discard any saved movement information from action information storage 215, and block the transaction from being processed.

While the above sequence of operations is described with respect to a wrist-wearable device, it should be recognized that any device that is capable of movement tracking may be used in the transaction authorization processes discussed herein. For example, a wearable augmented reality headset may track head movement information of the wearer of the augmented reality headset. The head movement information may be provided by both merchant and purchaser devices to transaction processor 154 for comparison, as discussed above.

Figure 4:
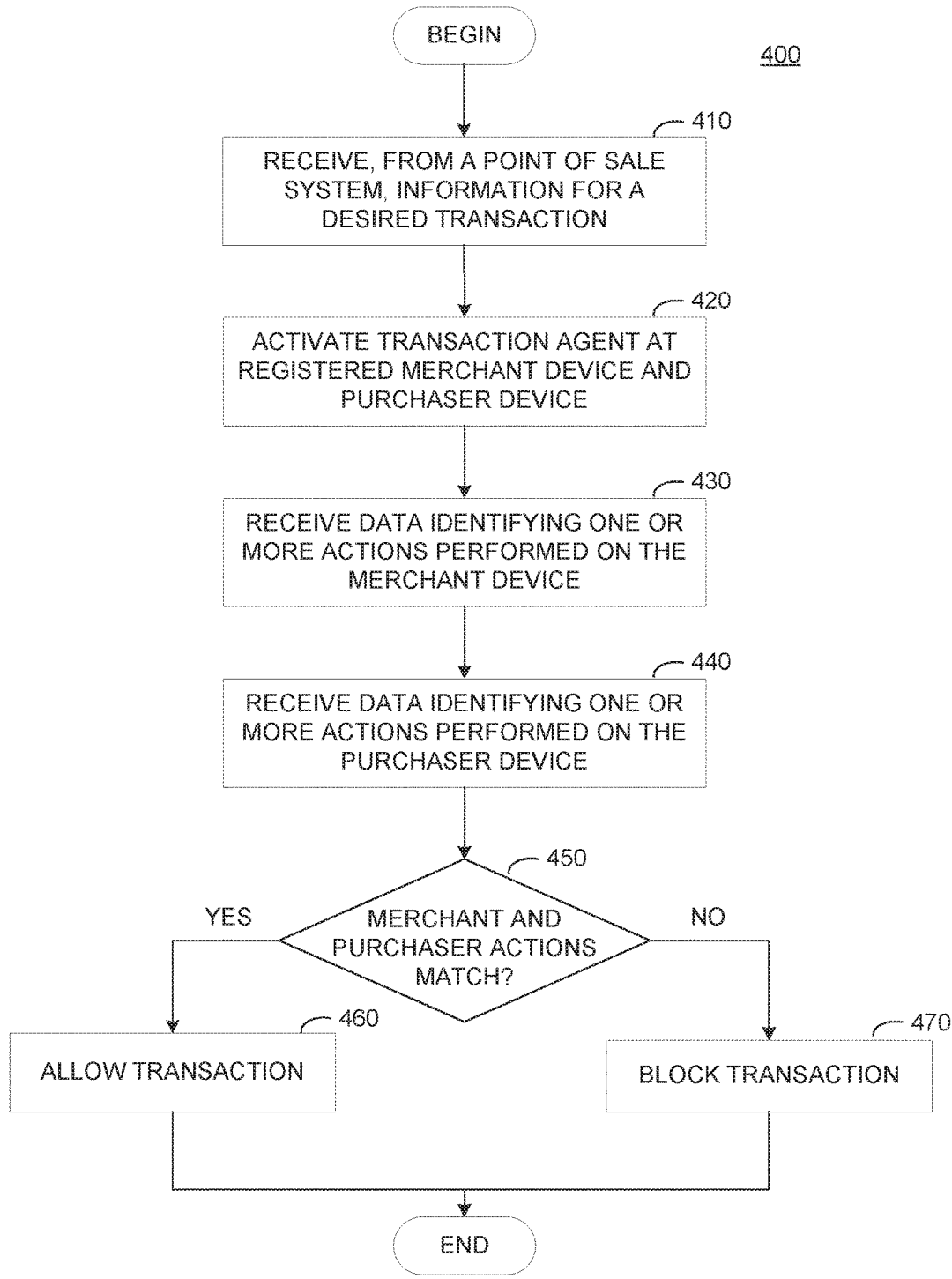
FIG. 4 illustrates a method for authenticating a transaction based on a comparison of actions performed on merchant and purchaser devices, according to one embodiment.

FIG. 4 illustrates example operations that may be performed by a transaction system 150 to authorize or reject a transaction based on action information received from a merchant device 130 and a purchaser device 140, according to an embodiment. As illustrated, operations 400 begin at step 410, where at transaction processor receives, from a point of sale system (e.g., POS system 120), information for a desired transaction. The information may include, for example, an identification of the merchant and an identification of the payment card used at the point of sale system. The information identifying the payment card may be encrypted at the point of sale system and decrypted at transaction system 150 to protect the payment card information from being compromised.

At step 420, transaction system 150 activates transaction agents at a registered merchant device and a registered purchaser device. The registered merchant device may be a device associated with the merchant and the POS system 120 that generated the transaction. The registered purchaser device may be a device associated with the payment card identified in the transaction information received from POS system 120. To activate transaction agents at the merchant device and purchaser device, transaction system 150 can transmit one or more messages to the merchant device and purchaser device indicating that the merchant device and purchaser device are to begin recording actions performed on the respective devices.

At step 430, transaction system 150 receives data identifying one or more actions performed on merchant device 130. The data identifying one or more actions may indicate, for example, a direction in which merchant device 130 was moved, a location at which merchant device 130 received touchscreen input, and so on. The data may include information about one or more actions performed on merchant device 130 over a window of time.

At step 440, transaction system 150 receives data identifying one or more actions performed on purchaser device 140. As with the action information received from merchant device 130, the action information received from purchaser device 140 may include information about a direction of movement, positions of touchscreen input, or other actions performed on purchaser device 140 over a window of time.

At step 450, transaction system 150 can compare the action information received from merchant device 130 and the action information received from purchaser device 140 to determine if the recorded actions match. If the recorded actions on merchant device 130 match the recorded actions on purchaser device 140, at step 460, transaction system 150 can authorize the transaction (e.g., initiate a funds transfer between a purchaser account and a merchant account). In authorizing the transaction, transaction system 150 may additionally transmit an indication to POS system 120 that the transaction was successfully processed.

Otherwise, if the recorded actions on merchant device 130 do not match the recorded actions on purchaser device 140, at step 470, transaction system 150 can block the transaction. In some cases, transaction system 150 may determine that the payment card associated with the transaction is compromised and may block future use of the payment card.

Figure 5:
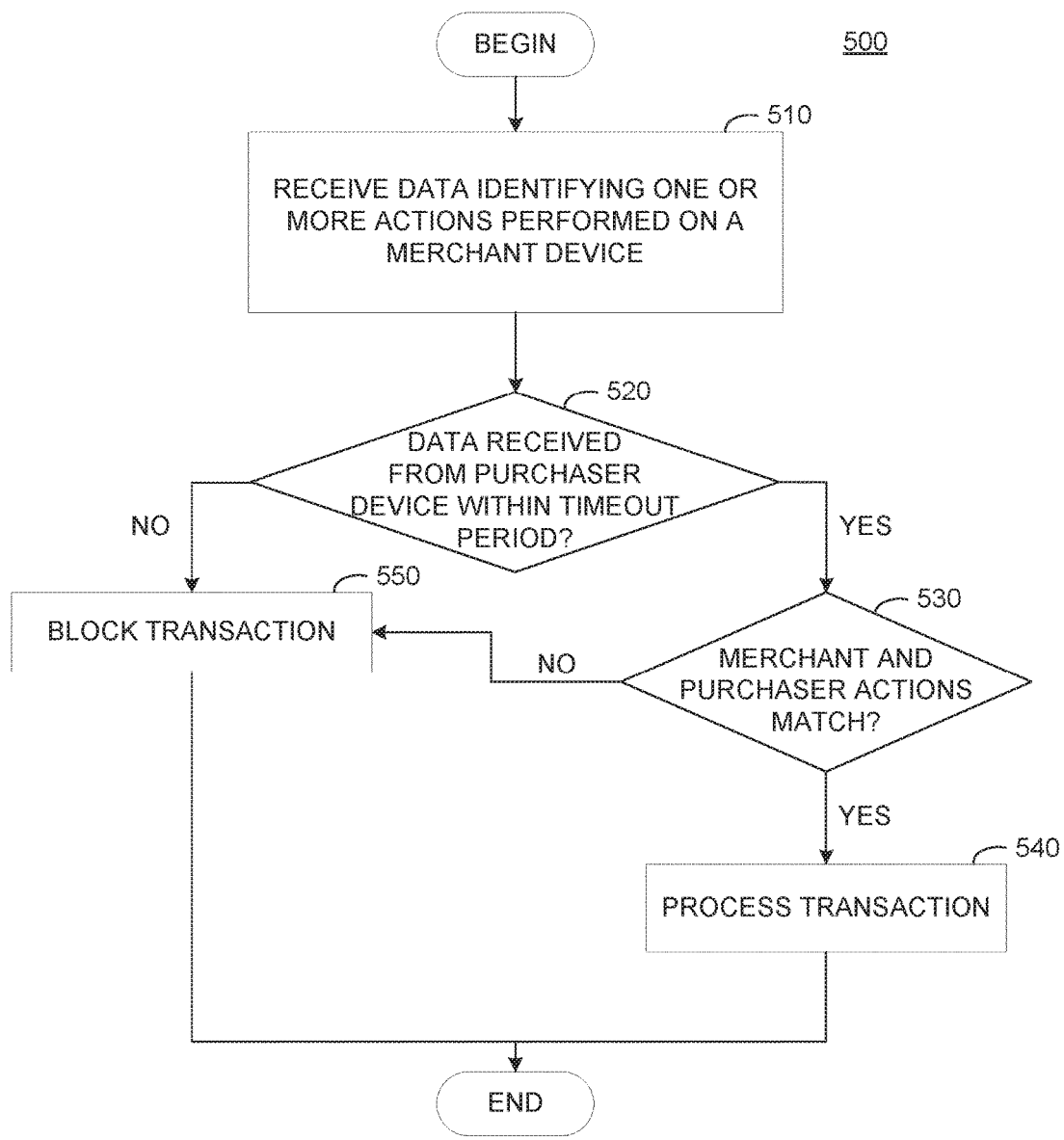
FIG. 5 illustrates a method for determining whether to process a transaction based on a comparison of actions performed on merchant and purchaser devices, according to one embodiment.

FIG. 5 illustrates example operations for authorizing a transaction based on action information received from a merchant device 130 and a purchaser device 140 and a timeout period, according to an embodiment. As illustrated, operations 500 begin at step 510, where transaction system 150 receives data identifying one or more actions performed on a merchant device 130 over a window of time. As discussed above, when transaction system 150 receives data about one or more actions performed on a merchant device 130, transaction system 150 can initiate a countdown timer for a timeout period in which purchaser device 140 is expected to transmit action information to transaction system 150.

At step 520, transaction system 150 determines if data identifying one or more actions performed on a purchaser device was received within a timeout period. If transaction system 150 has received data identifying one or more actions performed on a purchaser device 140 within the timeout period, at step 430, transaction system 150 determines if the actions performed on purchaser device 140 match the actions performed on merchant device 130. If the actions performed on purchaser device 140 substantially match those performed on merchant device 130 (e.g., both merchant device 130 and purchaser device 140 were moved in the same direction), transaction system 150 may determine that the transaction is an authorized transaction and proceed to process the transaction (e.g., initiate a funds transfer from a purchaser account to a merchant account) at step 540. In some cases, as discussed above, transaction system 150 can increment a counter of matching actions until the counter equals or exceeds a threshold number of matching actions, at which point transaction system 150 can process the transaction.

If, at step 530, transaction system 150 determines that the actions performed on merchant device 130 do not match the actions performed on purchaser device 140, transaction system 150 may determine that the transaction was not authorized by the owner of the payment card identified in the transaction data. At step 550, transaction system 150 can block the transaction. In some cases, when transaction system 150 blocks the transaction, transaction system 150 can transmit a message to POS system 120 indicating that the transaction was blocked, and in some cases, transaction system 150 can block future use of the payment card used in the blocked transaction.

If, at step 520, transaction system 150 does not receive data identifying one or more actions performed on a purchaser device 140 within the timeout period, transaction system 150 can determine that the payment card identified in the transaction is compromised. At step 550, transaction system can block the transaction action, as discussed above.

Figure 6:
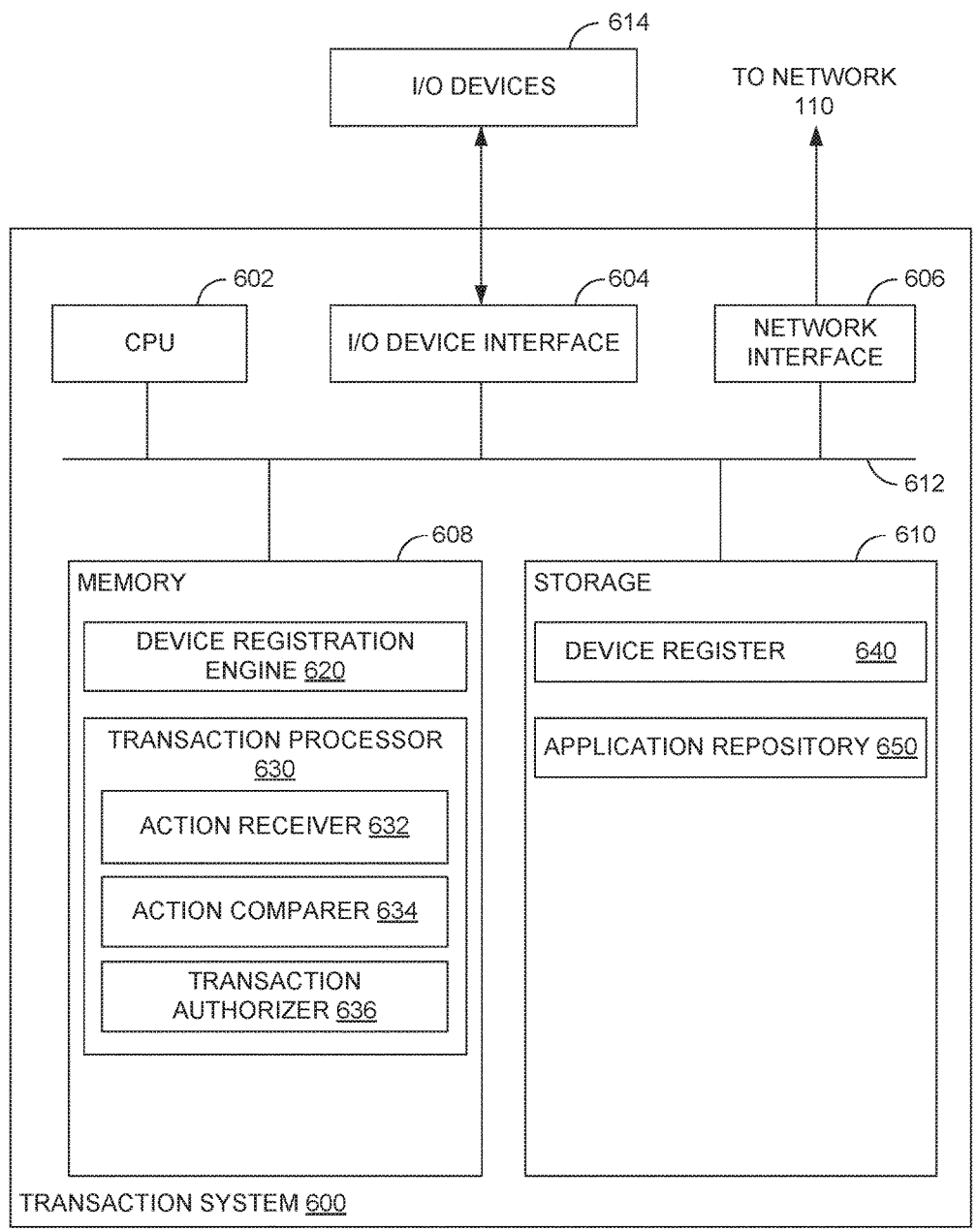
FIG. 6 illustrates an example transaction processing system that uses information about actions performed on merchant and purchaser devices to authenticate transactions performed at a point of sale (POS) system, according to one embodiment.

FIG. 6 illustrates an example transaction processing system 600 that uses a comparison between actions performed on a merchant device and a purchaser device to authenticate and process transactions generated at a point of sale system, according to an embodiment. As shown, transaction processing system 600 includes, without limitation, a central processing unit 602, one or more I/O device interfaces 604, which may allow for the connection of various I/O devices 614 (e.g., keyboards, displays, mouse devices, pen input, etc.) to the entity analytics system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, solid state drives, removable memory cards or optical storage, network attached storage (NAS), or a storage area-network (SAN).

As illustrated, memory 608 includes a device registration engine 620 and a transaction processor 630. Device registration engine 620 generally allows merchants and payment card owners to register devices for use in an action-based transaction authentication process. Device registration engine 620 may receive data identifying a device as a merchant device or a payment device, an account associated with the device (e.g., a merchant bank account or a payment card account), and data that uniquely identifies the device (e.g., device serial number or IMEI). Device registration engine 620 may store the device information in a data store (e.g., device register 640 at storage 610) and may transmit an application package (e.g., from application repository 650 at storage 610) to the device for installation.

Transaction processor 630, as illustrated, includes an action receiver 632, action comparer 634, and transaction authorizer 636. Action receiver 632 generally receives action information from a merchant device 130 and may start a countdown timer for an expected response from a purchaser device 140. If action receiver 632 does not receive action information from purchaser device 140 before the countdown timer expires, action receiver can indicate to transaction authorizer 636 that the transaction should be blocked. Otherwise, if action receiver 632 receives action information from purchaser device 140 before the countdown timer expires, action receiver 632 can transmit the merchant and purchaser action information to action comparer 634 for further processing.

Action comparer 634 generally compares the actions recorded at a merchant device 130 and a purchaser device 140 to determine if a transaction can be authorized. If action comparer 634 determines that the actions recorded at merchant device 130 and purchaser device 140 differ, action comparer 634 can indicate to transaction authorizer 636 that the transaction should be blocked. Otherwise, action comparer 634 can increment a counter of matching comparisons until the counter reaches a threshold number of matching comparisons. When the counter reaches the threshold number of matching comparisons, action comparer 634 can determine that the transaction is an authorized transaction and can transmit the transaction information to transaction authorizer 636 for completion.

Transaction authorizer 636 generally receives information from action receiver 632 and/or action comparer 634 indicating whether a transaction is authorized or should be blocked. If action comparer 634 indicates that a transaction is an authorized transaction, transaction authorizer 636 can process the transaction (e.g., initiate a funds transfer from a purchaser account to a merchant account for the amount identified in the transaction). Otherwise, transaction authorizer 636 can transmit one or more messages to a POS system 120 indicating that the transaction was denied. In some cases, transaction authorizer 636 may identify the payment card included in the transaction as a potentially compromised payment card and block future transactions performed using the payment card.

As shown, storage 610 includes a device register 640 and application repository 650. Device register 640 generally stores information about registered merchant devices and registered purchaser devices (e.g., a device identifier, such as a device serial number of IMEI, and an associated bank account). Device register 640 may be, for example, a relational database that transaction processor 636 can query to determine if a device is registered. Application repository 650 generally provides a repository for storing application packages that can be installed on a merchant device 130 or a purchaser device 140. As discussed above, a device registration engine 620 can, upon registration of a device, obtain a device package from application repository 650 for the type of device registered with transaction processing system 600 and install a transaction agent on the newly registered device using the obtained device package.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a Blu-Ray disk, a memory stick, removable flash memory (e.g., portable Universal Serial Bus memory sticks, Compact Flash, Secure Digital, etc.), a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, from a point of sale system, data identifying a plurality of transactions, wherein the data includes a merchant identifier and a payment account identifier;
   determining, based on the merchant identifier and the payment account identifier, a merchant device and a customer device on each of which user movement recording is to be activated;
   transmitting a first one or more data packets instructing the merchant device to activate user movement recording;
   transmitting a second one or more data packets instructing the customer device to activate user movement recording;
   receiving, from the merchant device, merchant movement data describing a recorded user movement performed using the merchant device;
   receiving, from the customer device, customer movement data describing a recorded user movement performed using the customer device;
   providing a counter of matching movements for incrementing a count of matching movements;
   providing a threshold count for the matching movements;
   upon determining that the data describing the recorded merchant movement data and the recorded customer movement data do not correspond to matching movements,
      blocking a first one of the plurality of transactions;
   upon determining that the data describing the recorded merchant movement data and the recorded customer movement data correspond to matching movements, incrementing the counter of matching movements; and
   upon determining that the counter of matching movements equals the threshold number of counts for the matching movements, wherein the threshold count is greater than one,
      authorizing and processing a second one of the plurality of transactions using the payment account identifier.

2. The method of claim 1, further comprising:
   receiving, from the merchant device, a request to register the merchant device, the request including the merchant identifier; and
   installing a transaction agent on the merchant device in response to the request.

3. The method of claim 1, further comprising:
   receiving, from the customer device, a request to register the customer device, the request including the payment account identifier; and
   installing a transaction agent on the customer device in response to the request.

4. The method of claim 1, wherein the merchant device and the customer device comprise one or more of a smartwatch or an augmented reality headset.

5. A system, comprising:
   a processor; and
   a memory comprising instructions which, when executed on the processor, performs an operation, the operation comprising:
      receiving, from a point of sale system, data identifying a plurality of transactions, wherein the data includes a merchant identifier and a payment account identifier;
      determining, based on the merchant identifier and the payment account identifier, a merchant device and a customer device on each of which user movement recording is to be activated;
      transmitting a first one or more data packets instructing the merchant device to activate user movement recording;
      transmitting a second one or more data packets instructing the customer device to activate user movement recording;
      receiving, from the merchant device, merchant movement data describing a recorded user movement performed using the merchant device;
      receiving, from the customer device, customer movement data describing a recorded user movement performed using the customer device;

providing a counter of matching movements for incrementing a count of matching movements;
providing a threshold count for the matching movements;
upon determining that the data describing the recorded merchant movement data and the recorded customer movement data do not correspond to matching movements,
blocking a first one of the plurality of transactions;
upon determining that the data describing the recorded merchant movement data and the recorded customer movement data correspond to matching movements, incrementing the counter of matching movements; and
upon determining that the counter of matching movements equals the threshold number of counts for the matching movements, wherein the threshold count is greater than one,
authorizing and processing a second one of the plurality of transactions using the payment account identifier.

6. The system of claim 5, wherein the merchant device and the customer device comprise one or more of a smartwatch or an augmented reality headset.

7. The system of claim 5, wherein the operations further comprise:
receiving, from the merchant device, a request to register the merchant device, the request including the merchant identifier; and
installing a transaction agent on the merchant device in response to the request.

8. The system of claim 5, wherein the operations further comprise:
receiving, from the customer device, a request to register the customer device, the request including the payment account identifier; and
installing a transaction agent on the customer device in response to the request.

9. A computer program product for transaction processing, the computer program product comprising a computer-readable storage medium having program instructions embodied therewith, the program instructions executable by a processor to perform an operation comprising:
receiving, from a point of sale system, data identifying a plurality of transactions,
wherein the data includes a merchant identifier and a payment account identifier;
determining, based on the merchant identifier and the payment account identifier, a merchant device and a customer device on each of which user movement recording is to be activated;
transmitting a first one or more data packets instructing the merchant device to activate user movement recording;
transmitting a second one or more data packets instructing the customer device to activate user movement recording;
receiving, from the merchant device, merchant movement data describing a recorded user movement performed using the merchant device;
receiving, from the customer device, customer movement data describing a recorded user movement performed using the customer device;
providing a counter of matching movements for incrementing a count of matching movements;
providing a threshold count for the matching movements;
upon determining that the data describing the recorded merchant movement data and the recorded customer movement data do not correspond to matching movements,
blocking a first one of the plurality of transactions;
upon determining that the data describing the recorded merchant movement data and the recorded customer movement data correspond to matching movements, incrementing the counter of matching movements; and
upon determining that the counter of matching movements equals the threshold number of counts for the matching movements, wherein the threshold count is greater than one,
authorizing and processing a second one of the plurality of transactions using the payment account identifier.

10. The computer program product of claim 9, wherein the merchant device and the customer device comprise one or more of a smartwatch or an augmented reality headset.

11. The computer program product of claim 9, wherein the operations further comprise:
receiving, from the merchant device, a request to register the merchant device, the request including the merchant identifier; and
installing a transaction agent on the merchant device in response to the request.

12. The computer program product of claim 9, wherein the operations further comprise:
receiving, from the customer device, a request to register the customer device, the request including the payment account identifier; and
installing a transaction agent on the customer device in response to the request.

* * * * *